United States Patent [19]

Bein

[11] Patent Number: 5,660,196

[45] Date of Patent: Aug. 26, 1997

[54] QUICK DISCONNECT RISER PIPE ASSEMBLY FOR CAN WASHER

[75] Inventor: Daniel J. Bein, Waukesha, Wis.

[73] Assignee: Oven Systems, Inc., Milwaukee, Wis.

[21] Appl. No.: 575,367

[22] Filed: Dec. 20, 1995

[51] Int. Cl.[6] .................................................. B08B 3/02
[52] U.S. Cl. ...................... 134/129; 134/131; 134/144; 134/152; 134/153; 285/376
[58] Field of Search ................................ 134/68, 72, 129, 134/131, 144, 148, 151, 152, 153, 199; 285/376

[56] References Cited

U.S. PATENT DOCUMENTS

| 2,268,900 | 1/1942 | Read ........................................ 134/129 |
| 2,539,432 | 1/1951 | Jones ....................................... 134/131 |
| 2,607,073 | 8/1952 | Johnson ................................ 134/131 X |
| 2,655,162 | 10/1953 | Zademach et al. ..................... 134/72 X |
| 2,940,458 | 6/1960 | Speckman ............................. 134/72 X |
| 3,262,460 | 7/1966 | Huddle et al. .......................... 134/72 |

FOREIGN PATENT DOCUMENTS 271377  5/1927  United Kingdom ...................... 134/72

Primary Examiner—Philip R. Coe
Attorney, Agent, or Firm—Andrus, Sceales, Starke & Sawall

[57] ABSTRACT

A quick disconnect supply riser for the nozzles of a can washing apparatus includes a bayonet connector and a riser support which provide inherent nozzle alignment when the risers are locked in connected position. Operator access to the capped opposite ends of the risers allows easy disconnection and reconnection via convenient openings in one side wall of the housing. The demountable connectors are attached to riser supply manifolds adjacent the opposite side wall thereby eliminating a large amount of excess piping.

6 Claims, 3 Drawing Sheets

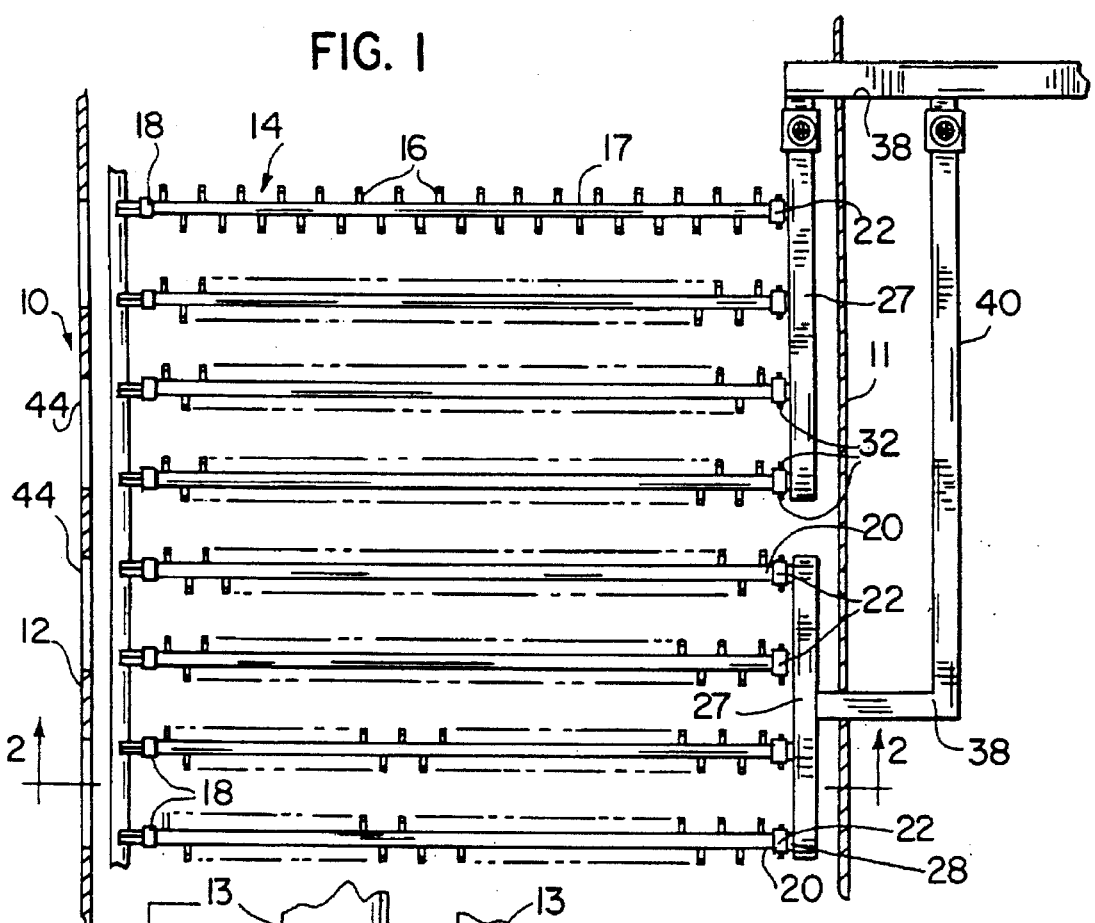
FIG. 1
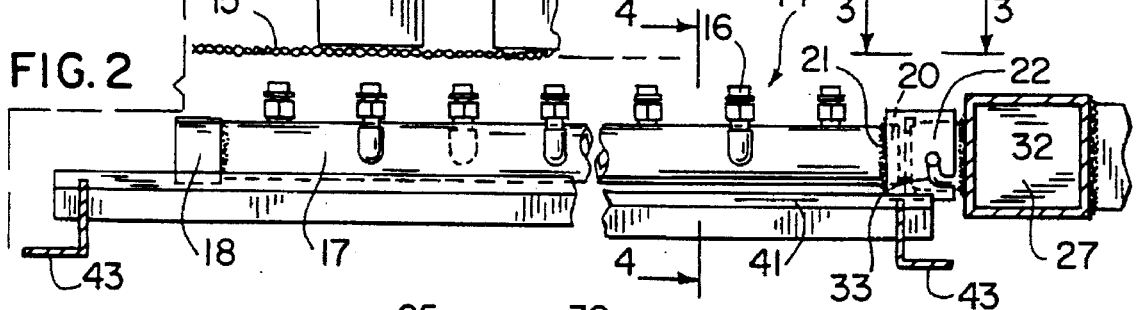
FIG. 2
FIG. 3

QUICK DISCONNECT RISER PIPE ASSEMBLY FOR CAN WASHER

BACKGROUND OF THE INVENTION

The present invention pertains to a quick attach and disconnect assembly for fluid supply pipes and, more particularly, to a connector and support assembly for the spray water supply pipes in a can washing apparatus.

Newly formed metal food and beverage cans are typically cleaned of forming oils and other contaminants in a high volume can washer in which masses of upstanding or inverted cans are moved on a mesh conveyor between upper and lower banks of laterally extending parallel water supply pipes or risers to each of which a plurality of respectively downwardly and upwardly oriented spray nozzles are attached. By carefully controlling nozzle orientation, flow and pressure, the cans may be moved through the washer supported solely from below by the wire mesh conveyor belt on which the cans are carried.

Each nozzle-carrying supply pipe or riser is typically capped on one end and has its opposite open end connected to a water supply manifold with a demountable coupling. Because of the need to supply large volumes of wash water to both the upper and lower banks of risers and nozzles, which in a conventional can washer may require as many as 20 risers in each bank, multiple manifolds are required for each bank and, correspondingly, multiple header feed pipes bringing water to the nozzles are also required. The resultant complex piping network requires that one side of the can washer housing be devoted primarily to accommodation of the mains supplying the wash water, leaving little or no room for access to the interior of the housing for maintenance, repair and replacement work. However, the use of corrosive wash waters creates the need for frequent maintenance, including disassembly and removal of the riser pipes from both the upper and lower banks. Conventional can washer construction has, therefore, provided worker maintenance and repair access to the housing on the side opposite the wash water supply. Typically, the riser feed manifolds for each bank are located along the access side of the housing and are supplied with wash water from individual header feed pipes which extend all the way through the housing from the piping supply side where they receive wash water from the main supply network. Each of the riser pipes is attached to the manifold with conventional quick disconnect couplings, such as a two-piece collar type utilizing a lever and overcenter cam locking device. These couplings are subject to corrosion and possible failure of the moveable operating components. With the need to remove and clean as many as 40 risers every two or three months, the task is tedious and time consuming. In addition, location of the riser feed manifolds on the access side of the housing requires a substantial number of header feed pipes to be run completely through the housing from the water supply side and may also require removal of the manifold to enable access to the risers for disconnection.

SUMMARY OF THE INVENTION

In accordance with the present invention, the header feed pipes within the washer housing are completely eliminated and the riser feed manifolds are mounted along the supply side of the washer housing. The risers are positioned with their capped ends on the opposite access side of the housing and the inlet ends are attached to the manifold with a bayonet-type quick disconnect assembly, allowing the riser pipe to be grasped at the capped end, turned on its axis and moved axially for quick disconnect or reconnect by reverse procedure. Each riser pipe is supported in a shallow V-shaped supporting trough which maintains the required horizontal orientation of the riser, and the bayonet connector automatically establishes the correct fixed position of the riser when locked in position so that the spray nozzles have the proper vertical orientation. The pipe supporting trough also provides a surface over which the riser pipe may be slid for removal or to provide direct coupling alignment when the pipe is slid in the opposite direction for connection.

The connector and support assembly of the present invention includes a first connector portion which is attached to the inlet end of the supply pipe, a second connector portion which is attached to the supply manifold and adapted to mate with the first connector portion to provide a fixed position fluid-tight connection, guiding and locking means on the connector portions responsive to combined axial and rotational movements of the supply pipe to establish the fixed position fluid-tight connection, and means for aligning the connector portions for attachment and for supporting the pipe after attachment.

Preferably, the first connector portion comprises an annular sleeve and the second connector portion comprises a nipple adapted to mate with the sleeve. The guiding and locking means, in the preferred embodiment, comprises a pair of diametrically opposed lugs attached to and extending radially outward from the nipple, and a slot in the sleeve for each of the lugs, each slot including an opening in the axial end of the sleeve for receiving the lug and a track providing a path for the lug in response to the axial and rotational movements of the supply pipe. The interior of the sleeve is provided with an annular sealing ring which is engaged by the end of the nipple in the locked fixed position.

The aligning and supporting means comprises a linear trough for each supply pipe, each trough extending parallel to and supporting the pipe from the underside thereof. The trough preferably comprises an angle member having a V-shaped cross section.

In its broadest aspect the improved assembly for demountably attaching the spray water supply pipes to the supply manifold is particularly adapted for use in a can washer of the type having an enclosed housing, horizontal banks of upper and lower pipes which extend laterally across the interior of the housing in spaced parallel relation, a plurality of water spray nozzles attached to each of the pipes to provide fixed position downwardly or upwardly directed spray patterns from the respective upper and lower banks, means for conveying cans horizontally between the banks of nozzles and longitudinally through the housing, and a water supply manifold for each bank of pipes which is positioned within the housing along one lateral side thereof and adapted to be operatively connected to the inlet ends of the pipes, with the attachment assembly comprising access means in the side of the housing opposite the manifolds, providing manual access to the pipe ends opposite their supply ends, a bayonet connector on the inlet end of each pipe and the manifold, which connector is operable in response to axial and rotational movements of the pipe to establish a locked operative fixed position, and means supporting the pipe for sliding axial movement and for holding the pipe in the fixed position.

BRIEF DESCRIPTION OF THE DRAWINGS

FIG. 1 is a top plan view of a portion of the interior of a can washer incorporating the riser pipe connector and support assembly of the present invention.

3

FIG. 2 is an enlarged vertical section taken on line 2—2 of FIG. 1.

FIG. 3 is an enlarged top plan view of the connector taken on line 3—3 of FIG. 2.

Figure 4:
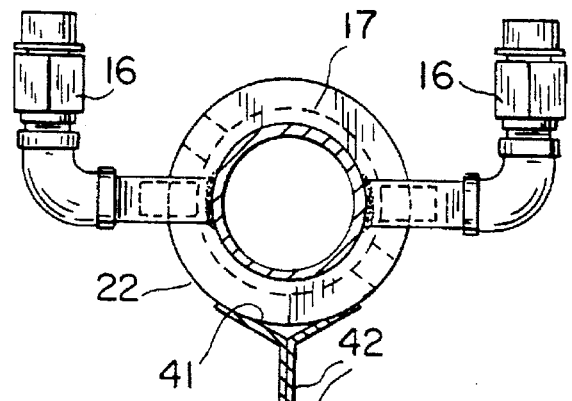

FIG. 4 is an enlarged vertical section taken on line 4—4 of FIG. 2.

Figure 5:
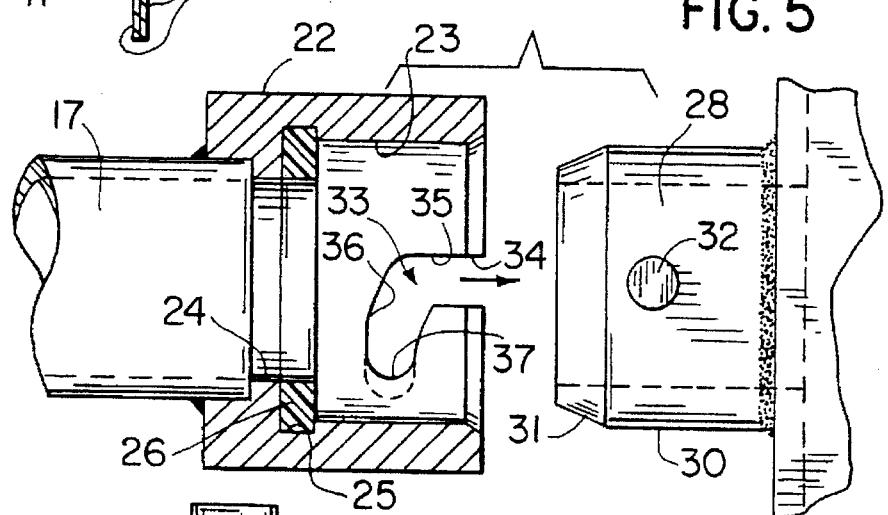
Figure 6:
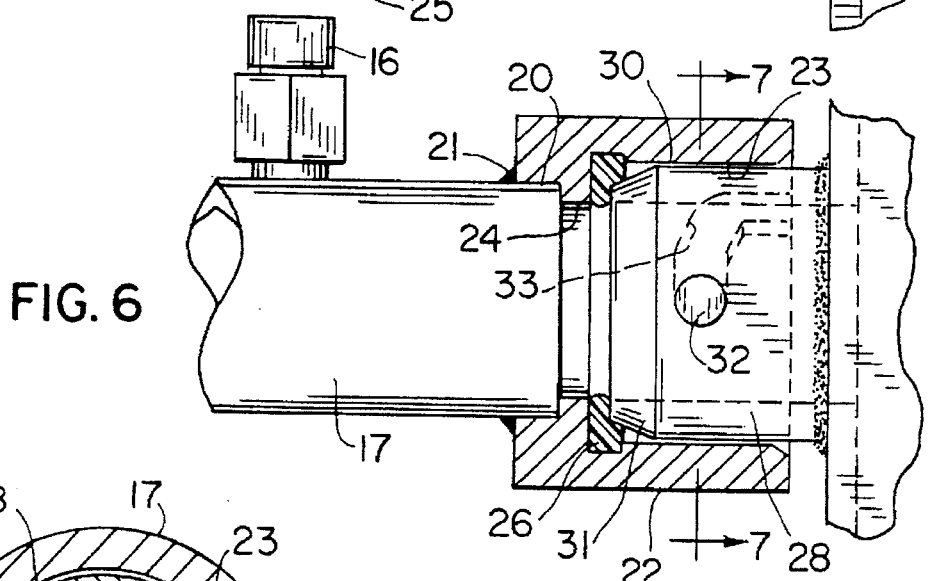

FIGS. 5 and 6 are enlarged side views, partly in section, showing the operation of the connector of the present invention.

Figure 7:
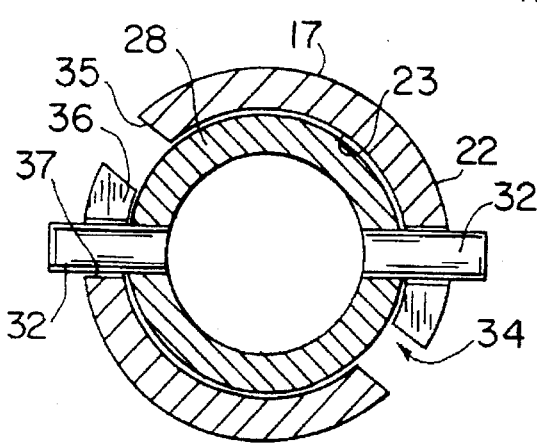

FIG. 7 is a vertical section taken on line 7—7 of FIG. 6.

Figure 8:
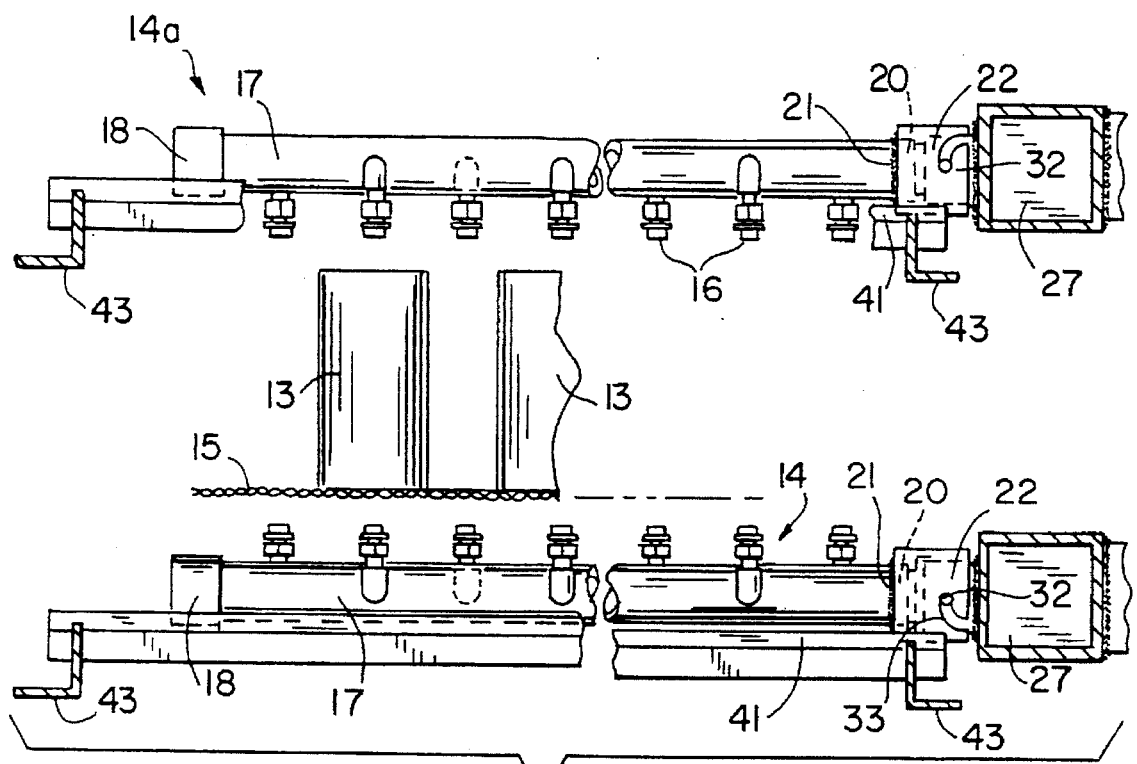

FIG. 8 is a view similar to FIG. 2 showing an enlarged vertical section also taken on line 2—2 of FIG. 1, but including the upper nozzle bank as well.

Figure 9:
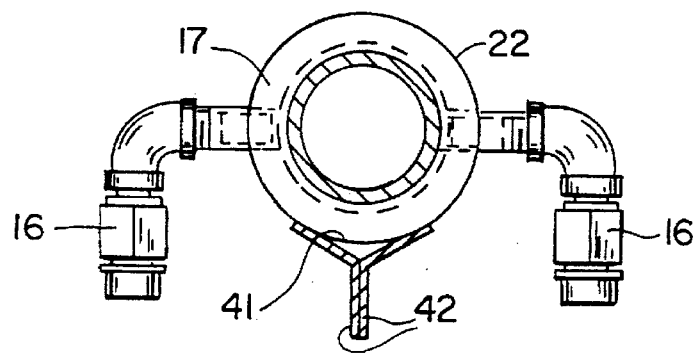

FIG. 9 is an enlarged vertical section taken on line 9—9 of FIG. 8.

DETAILED DESCRIPTION OF THE PREFERRED EMBODIMENT

Referring initially to FIG. 1, a can washer includes a substantially enclosed housing 10 of which only the lateral, vertically disposed side walls 11 and 12 are shown. Side wall 11 will also be referred to as the supply side wall and side wall 12 will also be referred to as the access side wall. In accordance with conventional construction and referring also to FIG. 2, the basic function of the can washer is to direct vertically opposed patterns of wash water spray against a group of open-ended can bodies 13 being carried horizontally on a wire mesh can conveyor 15 between a lower nozzle bank 14 and a virtually identical upper nozzle bank 14a (See FIG. 8). The conveyor 15 moves through the housing parallel to and between the side walls 11 and 12.

The nozzle bank on 14a includes groups of spray nozzles 16 attached to a common supply pipe or riser 17. As shown in FIGS. 1 and 2, the nozzles 16 of each group are attached in staggered relation to alternately opposite sides of the riser 17 and, in the lower nozzle bank 14 shown, the nozzles 16 point upwardly to provide the vertical upwardly oriented spray. It is understood that the upper nozzle bank 14a, shown in FIGS. 8 and 9, is identical to the lower bank 14, except that the nozzles are turned 180° to point vertically downwardly. It is critically important that the nozzles be vertically aligned and parallel with the can conveyor 15 in order to prevent cans from being knocked over by horizontal force components of misaligned nozzles. Thus, as will be described in greater detail, the connector and support assembly must be able to establish an accurate position of alignment when the nozzle carrying risers 17 are locked in their fixed operative positions.

Each riser 17 includes a closed cylindrical capped end 18 positioned adjacent the access side wall 12 and an opposite inlet end 20 which carries a portion of the quick disconnect connector of the subject invention. Referring also to FIGS. 3-7, the inlet end 20 of each riser has attached to it, as with a weld 21, an annular cylindrical sleeve 22. The sleeve 22 includes a cylindrical major ID 23 at its outer end which is stepped downwardly to a minor ID 24 leading into the inlet end of the riser 17. An annular channel 25 in the region of the shoulder separating the major and minor IDs 23 and 24 is adapted to receive an annular resilient sealing ring 26 which, when in place, has an ID generally equal to the minor ID 24 of the sleeve 22. Each of a group of adjacent risers 17 is connected to a common riser feed manifold 27 by a mating portion of the demountable connector. Specifically, a connector nipple 28 is attached to the manifold 27, as with a weld 29, and adapted to mate with the corresponding sleeve

4

22 on the inlet end of the riser. The nipple 28 has a cylindrical OD 30 sized to slide into the major ID 23 of the sleeve without interference. The end of the nipple includes a taper 31 to help guide it into position and which engages and compresses the sealing ring 26 when in the locked fixed position.

The connector includes a bayonet-type coupling comprising a pair of diametrically opposed lugs 32 which extend radially outwardly from the OD of the nipple 28 and are adapted to be received in a pair of diametrically opposite slots 33 in the cylindrical sleeve 22. Each of the slots 33 operates in the manner of a conventional bayonet connection whereby, to make the connection as shown in FIG. 5, the lug 32 is received in an opening 34 in the end of the slot, moves along an axial slot portion 35 as the sleeve 22 is slid axially over the nipple 28, and then angularly along a lateral slot portion 36 until the lug bottoms in the slot end 37. Simultaneously, the sealing ring 26 is being compressed to provide a liquid tight seal and the resilience of the seal helps maintain the riser 17 in the locked position (shown in FIGS. 6 and 7).

Each manifold 27 is supplied by a header feed pipe 38 which extends through the supply side wall 11 and receives wash water from a network of supply mains 40 outside the housing 10. The construction of the present invention eliminates the need to locate the manifolds on the access side of the housing and thus eliminates the need to extend the header feed pipes 38 laterally across the entire width of the housing.

Each of the risers 17 is supported in a V-shaped trough 41 which, as shown in FIG. 4, may be fabricated from a pair of angle members 42 joined in the shape of a Y. Each trough 41 is supported at its opposite ends on a pair of common support members 43 extending just inside the side walls 11 and 12.

To facilitate easy and convenient connection and disconnection of the risers 17, access openings 44 are provided in the access side wall 12 at spaced locations therealong. Each access opening 44 is preferably provided with a removable sealed door (not shown).

When it is desired to remove a riser for cleaning, repair, replacement or other maintenance, the operator reaches through the access opening 44 turns the riser on its axis to cause the lugs 32 to move along the lateral slot portions 36. The operator then pulls the riser axially to cause the lugs to slide along the axial slot portions 35 for disconnection. The operator may then remove the riser completely from the housing by allowing it to slide along the V-shaped trough 41. Significantly, the sealing ring 26 is mounted in the connector sleeve 22 and may, therefore, be easily replaced or inspected when the riser is pulled from the housing.

The procedure is merely reversed to reconnect the riser 17 to the manifold 27. The ODs of the capped end 18 and the cylindrical sleeve 22 are identical so that, in the connected position (as best seen in FIG. 2), the riser lies exactly parallel to the supporting trough and oriented precisely horizontally. This maintains the proper lateral attitude of the nozzles 16. Proper longitudinal attitude of the nozzles is assured by the fixed locked position of the connector lugs 32 in the slots 33.

I claim:

1. In a can washing apparatus of the type having an enclosed housing, horizontal banks of upper and lower water supply pipes extending laterally across the interior of the housing in spaced parallel relation, a plurality of water spray nozzles attached to each of the pipes to provide fixed position downwardly and upwardly directed spray patterns from the respective upper and lower banks, means for conveying cans horizontally between the banks of nozzles and longitudinally through the housing, and a water supply manifold for each bank of pipes positioned within the housing along one lateral side of the housing and adapted to be operatively connected to the inlet ends of the pipes, an improved assembly for demountably attaching each pipe to the manifold comprising:

access means in the other side of the housing for manually accessing the pipe end opposite its supply end;

a bayonet connector including a first connector portion on the inlet end of the pipe and a second connector portion on the manifold, said connector portions adapted to interengage in response to axial movement of the pipe toward the manifold to establish initial connection therebetween and subsequent rotational movement of said pipe on its axis to establish a locked operative fixed position; and, means supporting the pipe for sliding axial movement and for holding the pipe in the fixed position.

2. The assembly as set forth in claim 1, wherein said first connector portion comprises an annular sleeve and said second connector portion comprises a nipple mating with said sleeve.

3. The assembly as set forth in claim 2 wherein said connector comprises:

a pair of lugs attached to and extending radially outward from said nipple; and, a slot in the sleeve for each of said lugs, each slot including an opening in the axial end of the sleeve for receiving the lug and a track providing a path for the lug in response to said axial and rotational movements of the supply pipe.

4. The assembly as set forth in claim 2 including a resilient annular sealing ring seated in the interior of said sleeve and engageable by said nipple.

5. The assembly as set forth in claim 1 wherein the supply pipe is horizontally disposed in its fixed position and said supporting means comprises a linear trough extending parallel to and supporting the pipe from the underside thereof.

6. The assembly as set forth in claim 5 wherein said trough comprises a member having a V-shaped cross section.

* * * * *